United States Patent
Barve et al.

(10) Patent No.: US 7,093,946 B2
(45) Date of Patent: Aug. 22, 2006

(54) POWERFOLD EXTERIOR MIRROR ASSEMBLY

(75) Inventors: Amit S. Barve, Holland, MI (US); Richard J. Weber, Grand Haven, MI (US); Eric Shapin, Kentwood, MI (US); Leo W. Pavao, York, SC (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 10/929,230

(22) Filed: Aug. 30, 2004

(65) Prior Publication Data

US 2005/0111121 A1    May 26, 2005

Related U.S. Application Data

(60) Provisional application No. 60/501,186, filed on Sep. 8, 2003.

(51) Int. Cl.
*G02B 5/08* (2006.01)
*G02B 7/18* (2006.01)

(52) U.S. Cl. .................................. 359/841; 359/877
(58) Field of Classification Search ................ 359/841, 359/877
See application file for complete search history.

(56) References Cited

U.S. PATENT DOCUMENTS

| | | | |
|---|---|---|---|
| 3,119,591 A | | 1/1964 | Malecki |
| 4,699,024 A | * | 10/1987 | Iida et al. .................... 475/162 |
| 4,832,477 A | * | 5/1989 | Torii et al. ................... 359/877 |
| 5,005,797 A | * | 4/1991 | Maekawa et al. ........... 248/479 |
| 5,190,499 A | * | 3/1993 | Mori et al. ................... 464/36 |
| 5,210,651 A | | 5/1993 | Shibuya et al. |
| 5,424,898 A | | 6/1995 | Larson et al. |
| 5,489,080 A | | 2/1996 | Allen |
| 5,513,048 A | | 4/1996 | Chen |
| 5,546,239 A | | 8/1996 | Lewis |
| 5,572,376 A | | 11/1996 | Pace |
| 5,579,178 A | | 11/1996 | Mochizuki |
| 5,624,176 A | | 4/1997 | O'Farrell et al. |
| 5,659,423 A | | 8/1997 | Schierbeek et al. |
| 5,796,176 A | | 8/1998 | Kramer et al. |
| 5,900,999 A | | 5/1999 | Huizenga et al. |
| 5,903,402 A | | 5/1999 | Hoek |
| 5,949,591 A | | 9/1999 | Whitehead |
| 5,969,890 A | | 10/1999 | Whitehead |
| 5,986,364 A | | 11/1999 | Bingle et al. |
| 6,239,928 B1 | | 5/2001 | Whitehead et al. |
| 6,243,218 B1 | | 6/2001 | Whitehead |
| 6,325,518 B1 | | 12/2001 | Whitehead et al. |

* cited by examiner

*Primary Examiner*—Mark A. Robinson
(74) *Attorney, Agent, or Firm*—Van Dyke, Gardner, Linn & Burkhart, LLP

(57) ABSTRACT

An exterior rearview mirror assembly for a vehicle includes a base portion mounted to the vehicle and a movable portion that is pivotable relative to the base portion via a motor or motorized actuator or powerfold unit or the like. The powerfold unit is operable to pivot the movable portion relative to the base portion. The powerfold unit is mounted at one of the movable portion and the base portion and engages a receiving portion of the other of the movable portion and the base portion. A resilient element is positioned between and at least partially in engagement with the powerfold unit and the receiving portion. The resilient element is resilient and may at least partially compress as the powerfold unit is engaged with the receiving portion, thereby reducing or dampening vibration of the head portion relative to the base portion of the mirror assembly.

17 Claims, 3 Drawing Sheets

POWERFOLD EXTERIOR MIRROR ASSEMBLY

CROSS REFERENCE TO RELATED APPLICATION

The present application claims benefit of U.S. provisional application Ser. No. 60/501,186, filed Sep. 8, 2003, which is hereby incorporated herein by reference in its entirety.

FIELD OF THE INVENTION

The present invention relates generally to exterior rearview mirror assemblies for vehicles and, more particularly, to a powerfold exterior rearview mirror assembly which includes a movable portion or head portion and a motor or actuator that is operable to pivot the head portion relative to a base portion of the mirror assembly at the vehicle. The head portion is pivotable between a retracted or folded position and an extended or use position.

BACKGROUND OF THE INVENTION

It is well known in the automotive mirror art to provide a powerfold exterior rearview mirror assembly on a vehicle wherein a head portion or movable portion of the mirror assembly may be pivotable via a motor or power pack or actuator or the like, such that the movable portion or head portion may be pivoted about a generally vertical pivot axis relative to a sail or base or fixed portion of the mirror assembly. It is desirable to tightly secure or attach or affix the movable head portion to the powerfold motor power pack or unit to minimize vibration between the head portion and the base portion of the exterior rearview mirror assembly. As the size of the exterior mirror assemblies increases, there are greater concerns that the head portion may vibrate relative to the base portion.

SUMMARY OF THE INVENTION

The present invention provides a powerfold exterior rearview mirror assembly which provides enhanced vibrational performance. The exterior rearview mirror assembly includes a movable portion or head portion and a base portion mountable at an exterior portion of a vehicle. The mirror assembly includes a motor or motorized actuator that is operable to pivot the movable portion relative to the base portion. The powerfold exterior rearview mirror assembly of the present invention includes a resilient element or member positioned between the actuator and the actuator cavity, which is the receiving portion of the movable mirror portion. The resilient element may function to provide a secure attachment of the movable mirror portion relative to the actuator and base portion and may limit or substantially reduce vibration of the movable mirror portion to enhance the vibrational performance of the exterior rearview mirror assembly.

According to an aspect of the present invention, an exterior rearview mirror assembly for a vehicle includes a base portion mounted to the vehicle and a movable portion that is pivotable relative to the base portion via a motor or motorized actuator or powerfold unit or the like. The powerfold unit is operable to pivot the movable portion relative to the base portion. The powerfold unit is mounted at one of the movable portion and the base portion and engages a receiving portion of the other of the movable portion and the base portion. A resilient element is positioned between and at least partially in engagement with the powerfold unit and the receiving portion. The resilient element is resilient and may at least partially compress as the powerfold unit is engaged with the receiving portion. The resilient element provides a retention force between the post member and the post receiving portion to reduce or dampen vibration of the head portion relative to the base portion of the mirror assembly.

The motorized actuator or powerfold unit may include a post member, such as a post or support, which generally defines a pivot axis. The actuator may be mounted at the base portion, and the movable portion may include a post receiving portion for receiving the post member at least partially within the post receiving portion to mount the movable portion to the powerfold unit and base portion of the mirror assembly. Optionally, the post member may be positioned at the movable portion and the post receiving portion may be positioned at the base portion of the mirror assembly, without affecting the scope of the present invention.

The resilient element may comprise a spring clip or flexible metallic element that is positioned between and in engagement with the post member and post receiving portion. Optionally, the resilient element may comprise an elastomeric element or member that is positioned between and in engagement with the post member and post receiving portion and that may be partially compressed therebetween. Optionally, the resilient element may comprise an elastomeric or polymeric or rubber-like coating over at least a portion of the post member or over at least a portion of the post receiving portion. Other materials and shapes or forms of the resilient element or elements may be implemented, without affecting the scope of the present invention.

The resilient element may be positioned partially within a channel or recess at or along the post receiving portion and/or a channel or recess at or along the post member. The resilient element may protrude from the channel or recess of the post member or post receiving portion to engage the other of the post member or post receiving portion.

The post member may define a generally conical-shaped or sloped outer surface or sidewall. The post receiving portion may define a generally correspondingly formed or shaped surface, whereby the post member may be press fit or engaged with the surface of the of the post receiving portion. The resilient element may be positioned at the post member or at the post receiving portion such that when the post member is pressed into the post receiving portion the resilient element engages both the post member and the post receiving portion and provides a snug fit of the post member within the post receiving portion to reduce vibration between the post receiving portion and the post member and, thus, to reduce vibration of the exterior mirror body portion or movable portion.

Therefore, the present invention provides a powerfold exterior rearview mirror assembly which includes a resilient element or member between and in engagement with a support or post member and a post receiving portion of the mirror assembly. The resilient element provides a snug fit of the post member within the post receiving portion to reduce vibration between the post receiving portion and the post member and, thus, to reduce vibration of the exterior mirror body. The frictional engagement between the resilient element and the post member and post receiving portion and the retention forces provided by the resilient member may thus provide for enhanced vibrational performance of the exterior rearview mirror assembly.

These and other objects, advantages, purposes and features of the present invention will become apparent upon review of the following specification in conjunction with the drawings.

DESCRIPTION OF THE PREFERRED EMBODIMENTS

Figure 1:
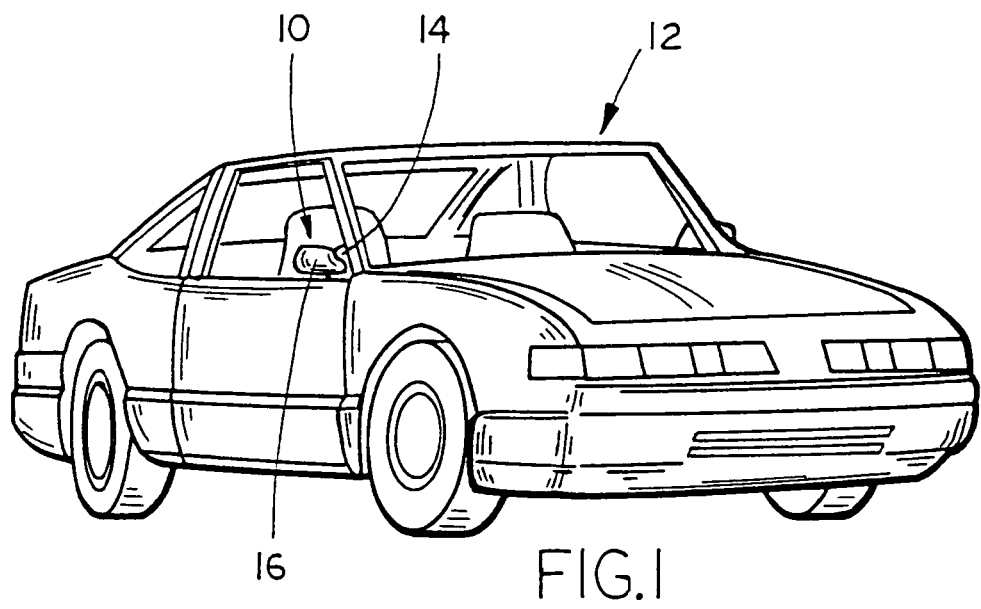
FIG. 1 is a perspective view of a vehicle having a powerfold exterior rearview mirror assembly in accordance with the present invention.
Figure 4:
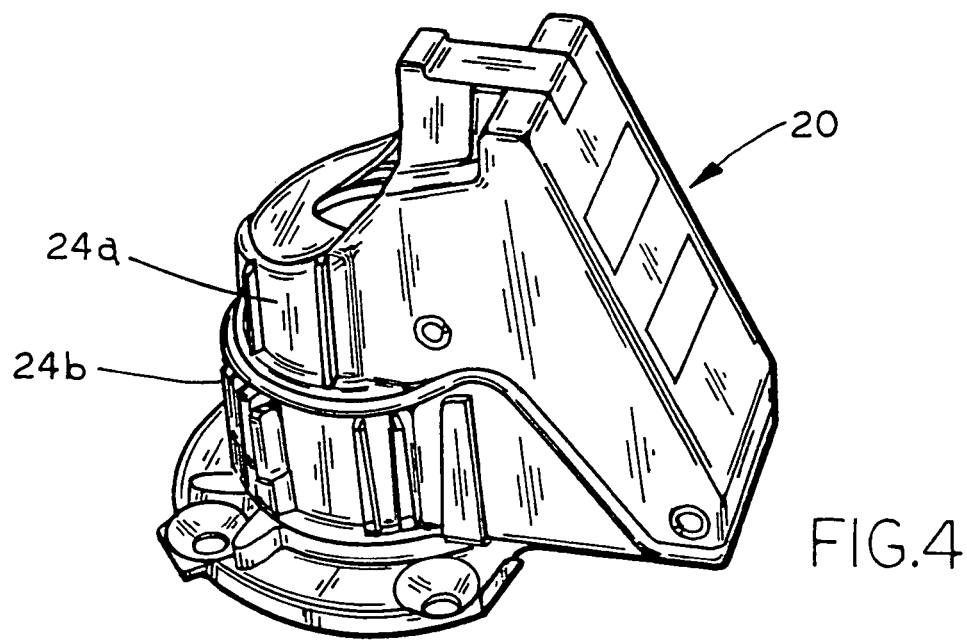
FIG. 4 is a perspective view of a motorized actuator suitable for use with the powerfold exterior rearview mirror assembly of the present invention.
Figure 2:
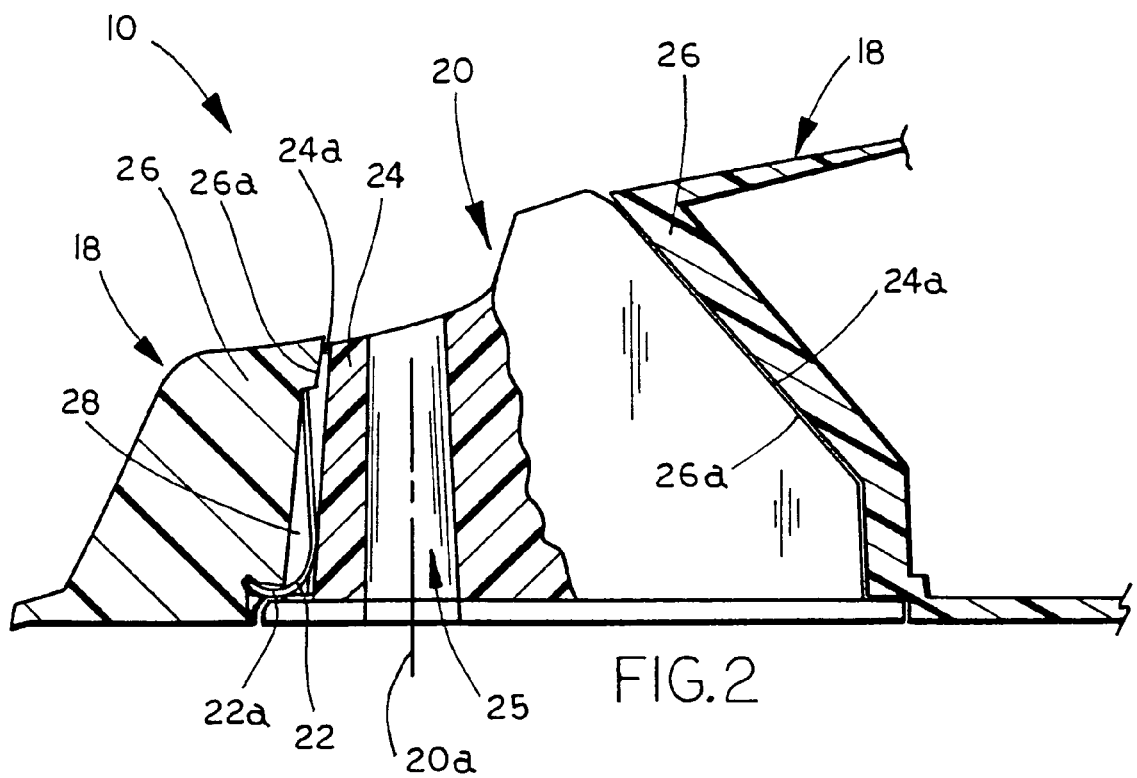
FIG. 2 is a sectional view of a powerfold pivot joint for the exterior rearview mirror assembly of the present invention, with a metallic spring clip or resilient element positioned between the movable portion and base portion of the mirror assembly.
Figure 3:
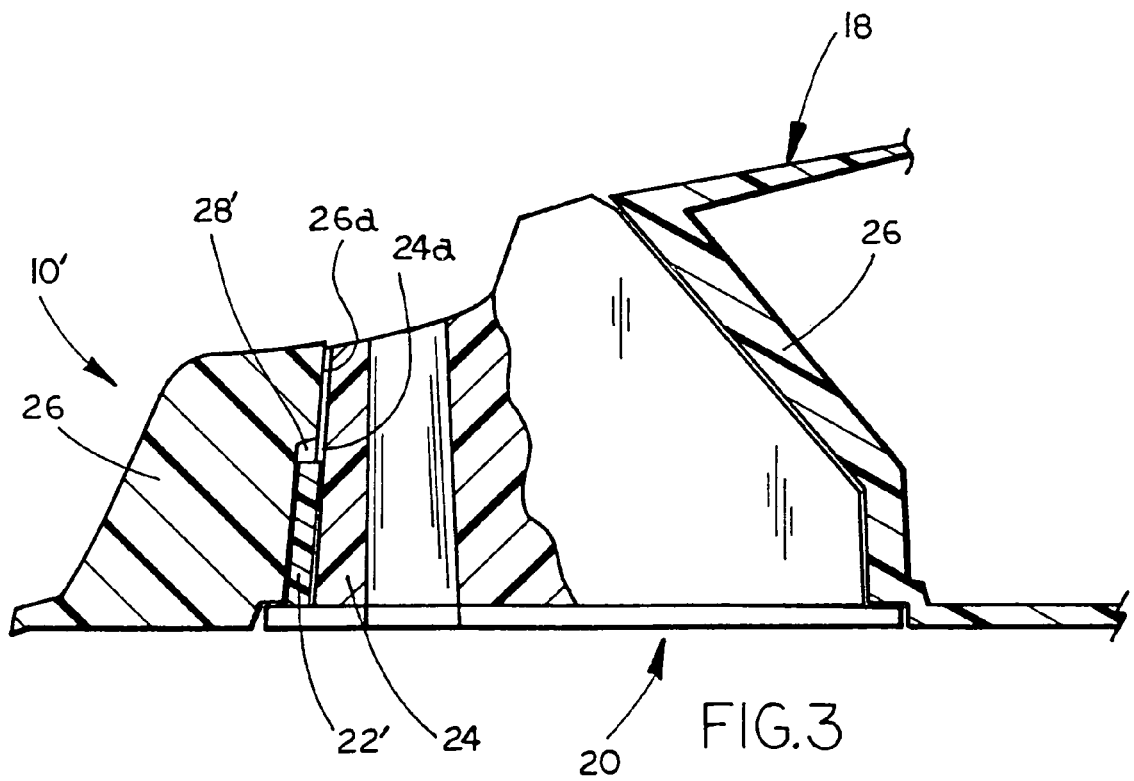
FIG. 3 is a sectional view of another powerfold pivot joint for the exterior rearview mirror assembly of the present invention, with an elastomeric resilient element positioned between the movable portion and base portion of the mirror assembly.

Referring now to the drawings and the illustrative embodiments depicted therein, a powerfold exterior rearview mirror assembly 10 is mounted to an exterior portion of one or both sides of a vehicle 12 (FIG. 1). Powerfold exterior mirror assembly 10 includes a generally fixed or non-movable base portion or mounting portion or sail portion 14, which is mounted to or affixed to the exterior portion of vehicle 12, and a head portion or movable portion 16, which is pivotally mounted to base portion 14. Head portion 16 of exterior rearview mirror assembly 10 includes a casing, which is secured to or attached to or mounted to a movable portion bracket 18 (FIGS. 2 and 3), and a reflective element (not shown) positioned at the casing. Head portion 16 and bracket 18 are movable or pivotable relative to fixed portion 14 by a motorized actuator or powerfold power pack or powerfold motor or unit or powerfold joint assembly 20 (FIGS. 2–4). A resilient element 22 is positioned between the powerfold motor unit 20 and the bracket 18 and engages both the powerfold motor unit 20 and bracket 18 to provide a tight engagement of the bracket to the powerfold motor unit to enhance vibrational performance of the mirror assembly, as discussed below. Powerfold motor unit 20 is operable to pivot or rotate bracket 18 and head portion 16 relative to fixed portion 14 about a pivot axis 20a in response to a control signal or user actuated input or control or the like, as is known in the art.

As shown in FIG. 2, powerfold motor unit 20 of exterior rearview mirror assembly 10 includes a pivot post or support member 24 which extends generally vertically upward from fixed portion 14 and defines pivot axis 20a. As can be seen in FIGS. 2–4, post member 24 may comprise a generally non-circular member such that rotation or pivotal movement of post member 24 causes a corresponding pivotal movement of bracket 18 and head portion 16 of mirror assembly 10. Bracket 18 (FIGS. 2, 3 and 5) includes a post receiving portion 26 which receives post member 24 at least partially therethrough to mount bracket 18 and head portion 16 to post member 24 of powerfold motor unit 20. Receiving portion 26 may include a surface or wall 26a for at least partially engaging an outer surface 24a of post member 24 when post member 24 is inserted into receiving portion 26. Powerfold motor unit 20 may comprise a passageway or wire-way 25 therethrough for routing a wire or cable (not shown) from the vehicle to the head portion to supply power or control signals to one or more electrical accessories at or within head portion 16, such as a wire-way of the type disclosed in U.S. Pat. No. 5,863,116, which is hereby incorporated herein by reference.

Figure 6:
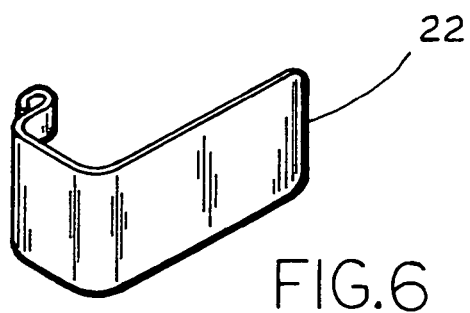
FIG. 6 is a perspective view of a resilient element that is positionable partially within a channel formed along the post receiving portion of the movable mirror portion or bracket of FIG. 5.

Resilient element or member 22 is positioned between at least a portion of receiving portion 26 and post member 24 and engages opposed surfaces of both receiving portion 26 and post member 24. In the illustrated embodiment of FIGS. 2 and 6, resilient element 22 comprises a metallic spring clip that is placed between the receiving portion 26 and post member 24 and may flex or compress as the receiving portion is pressed onto the post member. The spring clip resilient element 22 is resilient and biased to return to its initial unflexed or uncompressed form and thus exerts a retaining force on the opposed surfaces of the receiving portion and post member. The retaining force functions to tightly secure the bracket on the powerfold motor unit to reduce relative vibration therebetween and thus, to enhance the vibrational performance of the mirror assembly.

Figure 5:
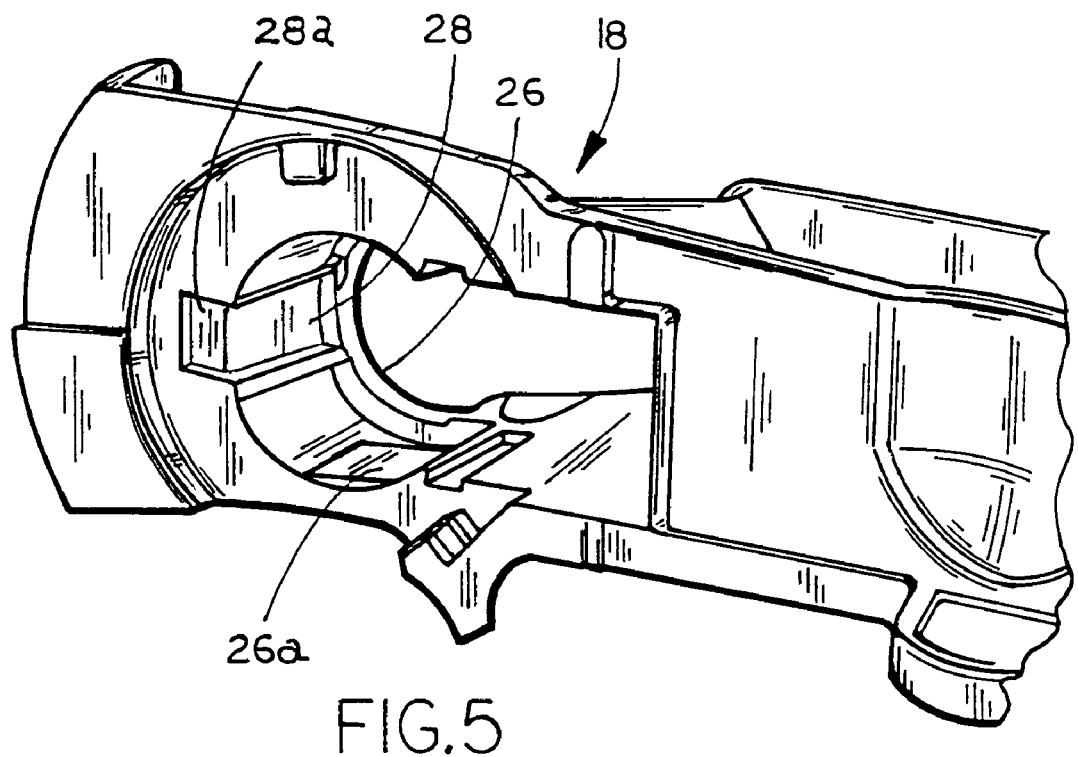
FIG. 5 is a perspective view of a movable mirror portion or bracket suitable for use with the powerfold exterior rearview mirror assembly of the present invention.

As best shown in FIGS. 2, 3 and 5, receiving portion 26 of bracket 18 may include a channel or groove 28 formed therein for partially receiving resilient element 22. The metallic spring clip resilient element 22 may be clipped in position within the channel 28 (such as via a lower or clip end 22a engaging a correspondingly formed portion 28a (FIG. 5) of the channel) to retain the resilient element in place in the channel during the assembly of the bracket 18 to the powerfold motor unit 20. As can be seen with reference to FIG. 4, post member 24 may include raised ribs 24b extending along its outer surface or surfaces for engaging and pressing against the opposed surface or surfaces of the receiving portion 26. The resilient element 22 may be positioned so as to align generally between an adjacent pair of ribs, such that the ribs engage the corresponding surfaces of the receiving portion, while the resilient element 22 engages the surface or surfaces between the ribs to enhance the retention of the bracket 18 on the powerfold motor unit 20.

Figure 7:
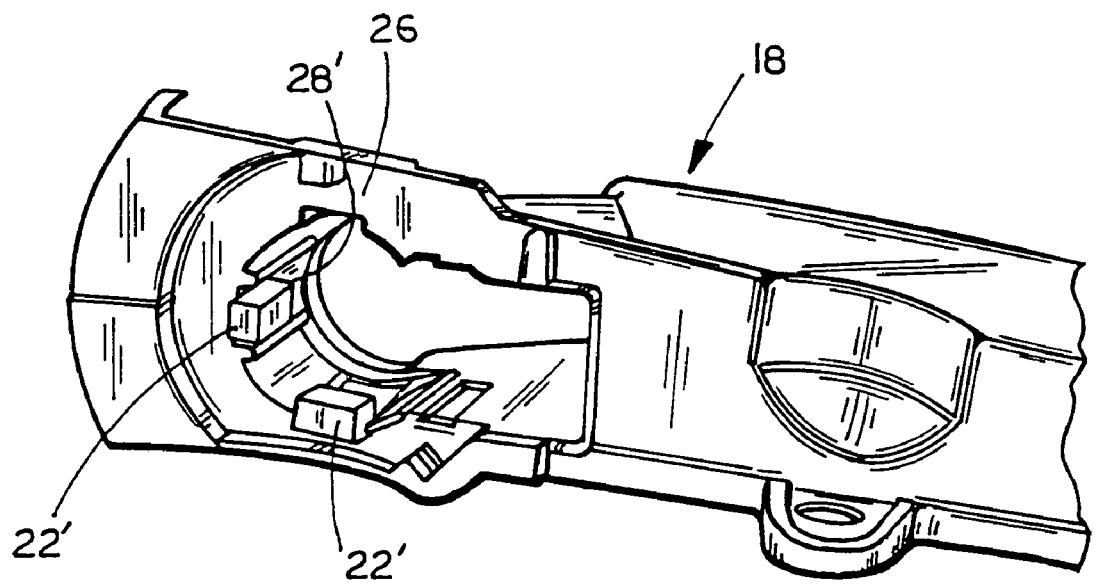
FIG. 7 is a perspective view of a movable mirror portion or bracket with a pair of resilient elements positioned partially within channels or recesses formed along the post receiving portion of the movable mirror bracket.

Optionally, the resilient element may be made from other materials, such as polymeric materials or elastomeric materials or the like. For example, and as shown in FIGS. 3 and 7, a resilient element 22' for a mirror assembly 10' may comprise an elastomeric element or member or block positioned between and in engagement with the opposed surfaces 26a, 24a of the receiving portion 26 and post member 24. The elastomeric resilient element 22' may be compressed as the bracket 18 is pressed onto the powerfold motor unit 20, but has resilient properties such that the element provides a retention force against the opposed surfaces to enhance retention of the bracket on the powerfold motor unit and to enhance the vibrational performance of the mirror. Similar to resilient element 22, discussed above, resilient element 22' may be positioned partially within and along a channel 28' along a portion of the receiving portion 26 of bracket 18, and may be positioned to engage the surface 24a of post member 24 between a pair of adjacent raised ribs 24b or the like. As can be seen with reference to FIG. 7, two or more resilient elements may be positioned around and between the opposed surfaces of the bracket and the powerfold motor unit to further enhance the retention of the bracket to the powerfold motor unit and to further enhance the vibrational performance of the exterior rearview mirror assembly, without affecting the scope of the present invention. Other resilient elements or members suitable for use between and in engagement with the movable mirror bracket and the powerfold motor unit that have or comprise other materials and/or shapes or forms may be implemented between and in engagement with the movable mirror bracket and the powerfold motor unit (such as, for example, an elastomeric or polymeric or rubber coating over at least a portion of one of the opposed surfaces, or other types of metallic flexible or polymeric clips or members or other types of elastomeric or rubber blocks or members or the like), without affecting the scope of the present invention.

Although shown as having the powerfold motor unit mounted to the base portion and the movable mirror bracket receiving the powerfold motor unit therein, the powerfold motor unit may otherwise be mounted to the head portion or movable portion and may be received in a receiving portion of the base portion of the mirror assembly, without affecting the scope of the present invention. Also, it is envisioned that the powerfold motor unit may comprise the receiving portion and the movable mirror bracket or the base portion may comprise the post portion, without affecting the scope of the present invention.

Therefore, when bracket 18 and movable portion or head portion 16 are assembled to powerfold motor unit 20 at base portion 14 of the exterior rearview mirror assembly 10, the resilient element or elements 22, 22' provides enhanced retention or retaining force between the bracket and powerfold motor unit and thus may dampen or reduce relative vibration therebetween. The resilient element of the present invention thus provides for enhanced vibrational performance of the exterior rearview mirror assembly. This is especially beneficial or desired in situations where the movable head portion of the mirror assembly is a large mirror portion and may include one or more accessories therein, such that the movable head portion is a relatively heavy head portion that otherwise may result in vibrational performance concerns with the exterior rearview mirror assembly. The resilient element of the present invention thus provides enhanced vibrational performance of the mirror assembly via a low cost, effective means.

The present invention thus provides a powerfold exterior rearview mirror assembly which includes a resilient element or member positioned generally between and at least partially in engagement with the powerfold motor unit post member and the post receiving portion of the movable mirror portion or head portion. The compression or flexing of the resilient element and the frictional engagement between the resilient element and both the post member and the post receiving portion may provide for enhanced vibrational performance of the exterior rearview mirror assembly. The resilient element may comprise a metallic or polymeric or elastomeric element or the like, and may provide an effective means for reducing the vibration of the head portion of the mirror assembly relative to the base portion at a relatively low cost and with minimal affect on the design and function of the mirror assembly.

Changes and modifications in the specifically described embodiments may be carried out without departing from the principles of the present invention, which is intended to be limited only by the scope of the appended claims as interpreted according to the principles of patent law.

The embodiments of the invention in which an exclusive property or privilege as claimed are defined as follows:

1. A powerfold exterior rearview mirror assembly for a vehicle comprising:

a base portion fixedly mountable to the vehicle;

a movable portion pivotally mounted to said base portion and pivotable about a pivot axis;

a powerfold unit having a pivotable portion having an outer surface, said powerfold unit being mounted at one of said movable portion and said base portion and engaging a receiving portion of the other of said movable portion and said base portion;

said receiving portion non-rotatably receiving said pivotable portion to mount said movable portion to said base portion, said receiving portion having an inner surface opposed to said outer surface of said pivotable portion when said pivotable portion is received in said receiving portion;

a resilient element positioned between and at least partially in engagement with said outer surface of said pivotable portion of said powerfold unit and said inner surface of said receiving portion, said resilient element being resilient to at least partially compress between said inner and outer surfaces as said powerfold unit is engaged with said receiving portion;

said powerfold unit being operable to pivot said pivotable portion to pivot said movable portion relative to said base portion; and said resilient element engaging said powerfold unit and said receiving portion to provide a substantially tight engagement of said movable portion to said powerfold unit to enhance vibrational performance of said mirror assembly.

2. The powerfold exterior rearview mirror assembly of claim 1, wherein said powerfold unit is mounted to said base unit and said movable portion comprises said receiving portion.

3. The powerfold exterior rearview mirror assembly of claim 1, wherein said resilient element is positioned partially within a recess or channel in at least one of said powerfold unit and said receiving portion.

4. The powerfold exterior rearview mirror assembly of claim 1, wherein said resilient element comprises a polymeric material.

5. The powerfold exterior rearview mirror assembly of claim 1, wherein said resilient element comprises a metallic material.

6. The powerfold exterior rearview mirror assembly of claim 1, wherein said resilient element comprises an elastomeric material.

7. The powerfold exterior rearview mirror assembly of claim 1, wherein said resilient element comprises an elastomeric coating over at least a portion of one of said powerfold unit and said receiving portion.

8. The powerfold exterior rearview mirror assembly of claim 1, wherein said resilient element comprises a flexible clip that flexes from an expanded position to a compressed position as said pivotable portion is received at least partially within said receiving portion.

9. The powerfold exterior rearview mirror assembly of claim 8, wherein said resilient element is biased toward said expanded position.

10. A powerfold exterior rearview mirror assembly for a vehicle comprising:
- a base portion fixedly mountable to the vehicle;
- a movable portion pivotally mounted to said base portion and pivotable about a pivot axis, said movable portion including a receiving portion;
- a powerfold unit being mounted to said base portion and having a pivotable portion, said pivotable portion having an outer surface;
- said receiving portion at least partially receiving said pivotable portion to mount said movable portion to said powerfold unit and said base portion;
- a resilient element positioned at least partially between and at least partially in engagement with an outer surface of said pivotable portion and an inner surface of said receiving portion, said resilient element being resilient to at least partially compress as said pivotable portion is received in said receiving portion;
- said powerfold unit being operable to pivot said pivotable portion relative to said base portion to pivot said movable portion relative to said base portion; and
- said resilient element engaging said powerfold unit and said receiving portion to provide a substantially tight engagement of said movable portion to said powerfold unit to enhance vibrational performance of said mirror assembly.

11. The powerfold exterior rearview mirror assembly of claim 10, wherein said resilient element is positioned partially within a channel in at least one of said pivotable portion and said receiving portion.

12. The powerfold exterior rearview mirror assembly of claim 10, wherein said resilient element comprises a polymeric material.

13. The powerfold exterior rearview mirror assembly of claim 10, wherein said resilient element comprises a metallic material.

14. The powerfold exterior rearview mirror assembly of claim 10, wherein said resilient element comprises an elastomeric material.

15. The powerfold exterior rearview mirror assembly of claim 10, wherein said resilient element comprises an elastomeric coating over at least a portion of one of said powerfold unit and said receiving portion.

16. The powerfold exterior rearview mirror assembly of claim 10, wherein said resilient element comprises a flexible clip that flexes from an expanded position to a compressed position as said pivotable portion is received at least partially within said receiving portion.

17. The powerfold exterior rearview mirror assembly of claim 16, wherein said resilient element is biased toward said expanded position.

* * * * *